Oct. 7, 1930.                P. KLEIN ET AL                    1,777,646
            METHOD FOR MAINTAINING UNIFORMITY IN COMPOSITION
                   OF LIQUID DISPERSIONS OR EMULSIONS
                          Filed Jan. 31, 1928
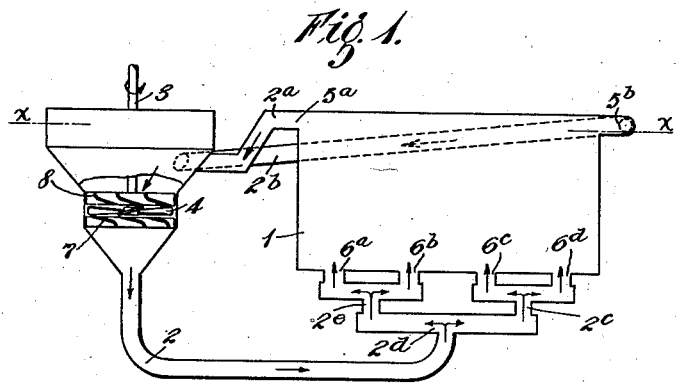
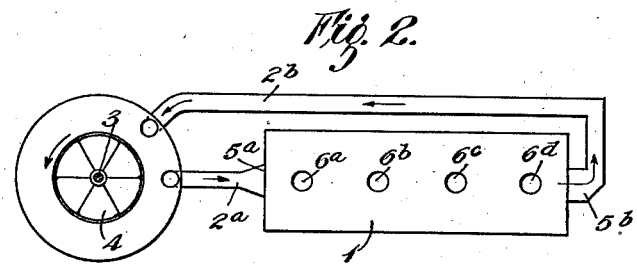
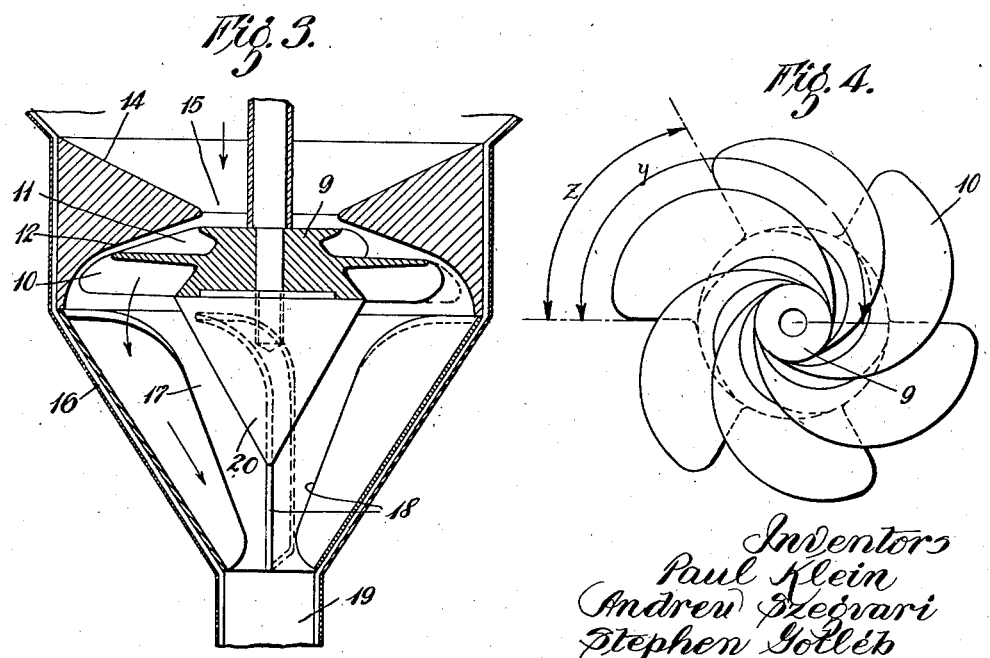
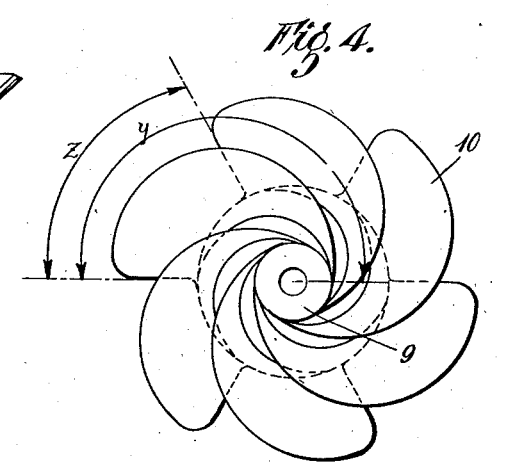
Inventors
Paul Klein
Andrew Szegvari
Stephen Gotleb
By Pierson Eakin + Avery
Attys Patented Oct. 7, 1930

1,777,646

UNITED STATES PATENT OFFICE

PAUL KLEIN, OF BUDAPEST, HUNGARY; ANDREW SZEGVÁRI, OF AKRON, OHIO; AND STEPHEN GOTLÉB, OF BUDAPEST, HUNGARY, ASSIGNORS TO AMERICAN ANODE INC., OF AKRON, OHIO

METHOD FOR MAINTAINING UNIFORMITY IN COMPOSITION LIQUID OF DISPERSIONS OR EMULSIONS

Application filed January 31, 1928, Serial No. 250,946, and in Germany February 22, 1927.

The present invention relates to a method of and apparatus for preventing the separation of the constituents of liquid dispersed systems, especially of such dispersions as contain constituents of different specific gravities and the celloidal dispersed phase of which or part of the same has a tendency to pectization, flocculation or coagulation.

In the treatment of many liquid dispersions such as aqueous rubber dispersions, e. g. natural rubber latex which is admixed with various additions in a finely divided state, it is necessary to carry out the treatment in such way that the entire liquid maintains a uniform composition throughout for a certain period and that the lighter constituents are prevented from floating on the surface of the liquids and the heavier constituents from depositing at the bottom of the liquid.

Ordinary agitating devices which would be sufficiently effective to maintain the uniformity of the mixture are not suitable for this purpose because they easily lead to pectization, flocculation or coagulation of the latex.

According to the invention, the tendency of the heavier constituents of an aqueous dispersion, to settle to the bottom or the tendency of the lighter constituents to float on the surface is counteracted by causing the liquid dispersion to execute a movement in the inverse sense to the movement that would be made by the heavier constituents during their settlement or by the lighter constituents during their flotation.

In the preferred form of carrying out the invention, the liquid dispersed system is caused to move upwardly from the point where the constituents of highest specific gravity tend to separate out towards the point where the constituents of lower specific gravity tend to separate out, that is to say, the liquid dispersion is continuously passed from the uppermost point towards the lowest point outside the place where the liquid dispersion is treated.

In carrying out the aforesaid method, the vessel in which the treatment of the aqueous dispersion is effected may be provided with a by-pass conduit leading from the top, preferably near the liquid level of the vessel, to the bottom. In said by-pass conduit is provided a liquid conveying device which causes the liquid dispersion to execute a movement in the receptacle containing the dispersion in such a way that the liquid dispersion issuing from the top of the receptacle is returned to the dispersion in the receptacle at the bottom, this movement being continued so that the liquid dispersoin is kept in circulation.

Preferably, the inlet and outlet conduits leading from the by-pass to and from the receptacle are branched off.

Two apparatus suitable for carrying out the invention will hereinafter be described in detail with reference to the accompanying drawings in which:—

Fig. 1 shows a diagrammatical vertical section of one embodiment of apparatus and Fig. 2 is a plan thereof.

Fig. 3 is a vertical section of a modification of conveying device suitable for attaining high axial flow speeds.

Fig. 4 is a plan of the conveyor screw of Fig. 3.

In Fig. 1, 1 denotes the receptacle containing the dispersion to be kept in a uniformly dispersed condition. The receptacle 1 is provided with a by-pass conduit 2 which leads from the top of the liquid level $x$ to the bottom of the receptacle 1. In this by-pass conduit 2, is located the conveyor screw 4 driven through the shaft 3. This screw is preferably rotated in such manner that the liquid is caused to flow in the direction of the arrow so that the liquid enters at the bottom of the receptacle 1 and leaves at the top, flowing to the conveyor screw 4. The by-pass channel leading from the receptacle 1 near the level of the liquid $x$ is preferably branched off to form a plurality of branches for example 2, $2^a$, and $2^b$ at opposite ends $5^a$ and $5^b$ of the receptacle 1, and the connection of the by-pass 2 to the bottom of the receptacle 1 is also branched off to form a plurality of discharge pipes $2^c$, $2^d$ and $2^e$ so that for example four points of discharge $6^a$, $6^b$, $6^c$ and $6^d$ are provided.

In order to prevent detrimental knocks between the liquid and the conveyor screw 4 either the delivery side of the conveyor screw 4 or, as shown in the drawings, both sides of the conveyor screw may be provided with stator wheels 7 or 8, which allow the liquid dispersion to flow to and from the conveyor screw 4 with as little knocking as possible. Instead of an ordinary conveyor screw 4 a multi-cell wheel which is constructed similar to a rotor of an ordinary turbine may advantageously be employed.

The embodiment of apparatus shown in Figs. 3 and 4 is especially suitable for carrying out the herein-described method. The characteristic feature of this construction is that the liquid is caused to enter and leave the rotor of the turbine to a slight extent in axial direction, but to flow through the rotor mainly in a radial direction. The liquid dispersion is admitted near the nave of the rotor by means of an inlet cone which tapers towards the rotor, while the liquid is discharged through a confuser connected to the periphery of the rotor. A guide cone is preferably provided axially of the confuser whilst guide blades are preferably provided between the guide cone and the walls of the confuser.

The rotor is provided with helicoidal blades which are wound around a cone with an angle of more than 90°, if possible up to 180°, said cone diverging from the inlet side towards the outlet side, the outer surface of the rotor being also formed in the shape of a cone diverging in the direction of flow. The number of the blades should preferably be such that the angle between the tips of the successive blades is smaller than the angular extent of the blades, preferably one half thereof, so that the cells formed between the blades are as long as possible.

As shown in Figs. 3 and 4, the rotor is provided with a conical nave 9 diverging in the direction of flow, around which the blades 10 are wound to an angular extent $y$ of more than 90° preferably 180°. The angle $z$ between the tips of successive blades amount to less than one half the angle $y$ so that longitudinal cellular channels 11 are formed between the blades (Fig. 3). As can be seen from this Fig. 3 the outer rotor surface and consequently also the casing 12 are of approximately conical shape. The liquid is supplied through the inlet cone 14 which converges towards the rotor 10 so that the inlet of the liquid takes place at 15 near the nave, in an axial direction. During the passage through the rotor, the liquid passes through the cells 11 of the rotor in an axial direction as well as in a radial direction and issues from the rotor again in an axial direction but over a greater area than that of the inlet. A guide cone 15 is connected to the delivery side of the rotor behind the nave 9 and the confuser 16 is connected to the periphery of the casing 12, in such way that the exit channel 17 is formed between this confuser and the guide cone. In this channel are arranged the guide blades 18 which enable a whirl free passage of the liquid from the delivery side of the rotor or from the periphery of the latter towards the axial delivery connection 19 of the turbine.

By the above described means it is possible to cause the required movement of the liquid dispersion and to maintain the composition of the liquid uniform without interfering with the colloidal conditions of the constituents of the dispersion. We wish it to be understood that the invention is not intended to be restricted to its application to rubber dispersions. The above described method has the additional advantage that it obviates skin-formation on the surface of the dispersion which is sometimes very troublesome.

Having now particularly described and ascertained the nature of our said invention and in what manner the same is to be performed, we declare that what we claim is:—

1. The method of maintaining uniformity in composition of aqueous dispersions, such as latices of rubber, liable to coagulate under the influence of shock or agitation, which comprises imparting a general continuous upward movement to substantially the entire body of dispersion contained in a vat or receptacle by withdrawing the dispersion at or adjacent the surface thereof and reintroducing the dispersion into the bottom of the vat or receptacle.

2. The method of maintaining uniformity in composition of aqueous dispersions, such as latices of rubber, liable to coagulate under the influence of shock or agitation, which comprises imparting a general continuous upward movement to substantially the entire body of dispersion contained in a vat or receptacle by withdrawing the dispersion at or adjacent the surface thereof and reintroducing the dispersion into the bottom of the vat or receptacle, the movement of the dispersion being effected by a continuous impelling device adapted to avoid shock or agitation of an order liable to induce coagulation of the dispersion.

3. The method of maintaining uniformity in composition of aqueous dispersions, such as latices of rubber, liable to coagulate under the influence of shock or agitation, which comprises imparting a general continuous upward movement to substantially the entire body of dispersion contained in a vat or receptacle by withdrawing the dispersion at or adjacent the surface thereof and reintroducing the dispersion into the said body through a plurality of streams distributed throughout the lower strata of said body of dispersion.

4. The method of maintaining in a vat or receptacle uniformity in composition of dispersions, such as latches of rubber, liable to coagulate under the influence of shock or agitation, which comprises imparting a general continuous slow upward movement to substantially the entire body of dispersion, withdrawing the dispersion adjacent the surface thereof, and impelling the dispersion withdrawn from, and before reintroduction into, said body, without shock or agitation of an order liable to induce coagulation of the dispersion.

In testimony whereof we affix our signatures.

Dr. PAUL KLEIN.
ANDREW SZEGVÁRI.
STEPHEN GOTLÉB.